United States Patent [19]  
Kurtz et al.

[11] 3,924,322  
[45] Dec. 9, 1975

[54] ECONOMICAL PRESSURE TRANSDUCER ASSEMBLIES, METHODS OF FABRICATING AND MOUNTING THE SAME

[75] Inventors: Anthony D. Kurtz, Englewood; Amnon Brosh, Demarest; Charles L. Gravel, River Edge; Joseph R. Mallon, Alpine, all of N.J.

[73] Assignee: Kulite Semiconductor Products, Inc., Ridgefield, N.J.

[22] Filed: Jan. 27, 1975

[21] Appl. No.: 542,026

Related U.S. Application Data

[62] Division of Ser. No. 423,713, Dec. 11, 1973, Pat. No. 3,900,811.

[52] U.S. Cl. .................................... 29/580; 29/591
[51] Int. Cl.² .......................................... B01J 17/00
[58] Field of Search ....... 29/580, 583, 591, 610 SG, 29/588

[56] References Cited
UNITED STATES PATENTS 3,757,414   9/1973   Keller .................................. 29/580
3,758,830   9/1973   Jackson ......................... 29/610 SG
3,764,950   10/1973  Wallia .................................... 338/2
3,800,264   3/1974   Kurtz ..................................... 338/2

Primary Examiner—W. Tupman
Attorney, Agent, or Firm—Arthur L. Plevy

[57] ABSTRACT

There is disclosed apparatus to provide a low cost transducer which may be conveniently mounted in a transistor or I.C. header while capable of giving accurate measurements in the presence of extraneous disturbances. An oxide layer is grown over a piezoresistor pattern, the layer is opened and contacts are deposited. Depressions are etched beneath the pattern to form individual cups for the plurality of patterns. The slice as etched is sealed to a glass sheet which serves to close the bottom of the cup. The glass is then sealed to a thick slice of silicon which serves as an attenuator to isolate the transducer from insignificant perturbations. The unit is then mounted within a TO-5 can or flat pack header with the piezoresistive pattern facing upwards or exposed.

6 Claims, 12 Drawing Figures

U.S. Patent Dec. 9 1975 3,924,322
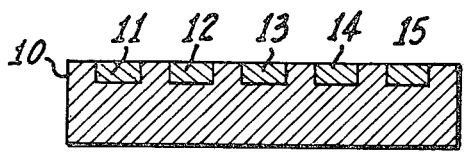
Fig.1A.
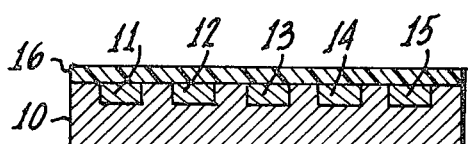
Fig.1B.
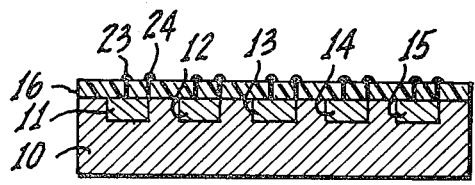
Fig.1C.
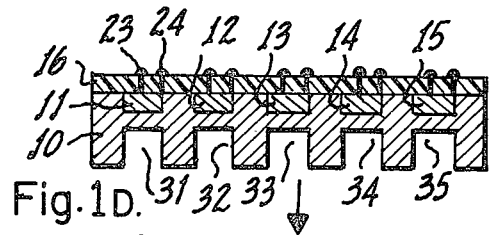
Fig.1D.
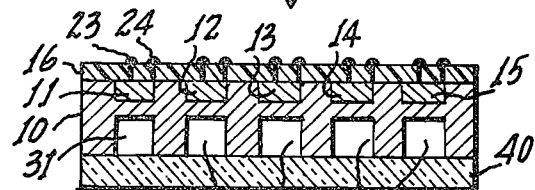
Fig.1E.
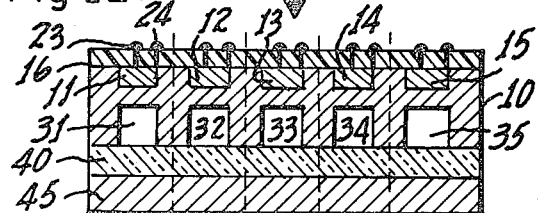
Fig.1F.
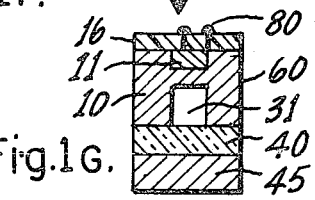
Fig.1G.
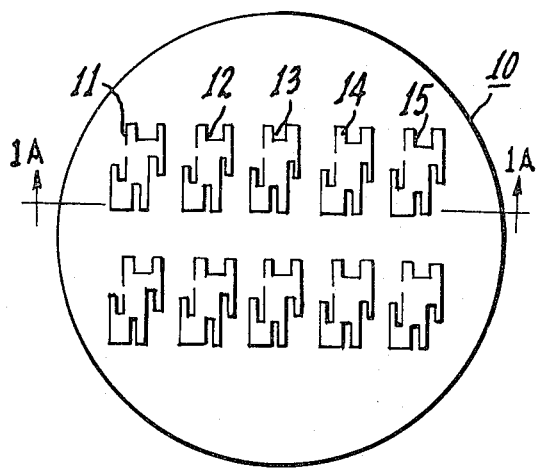
Fig.2.
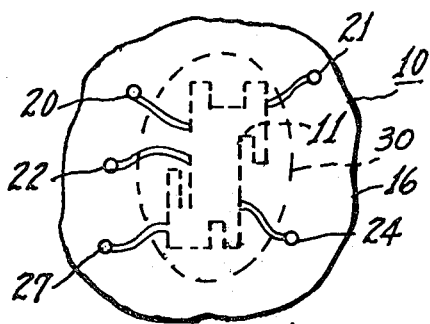
Fig.3.
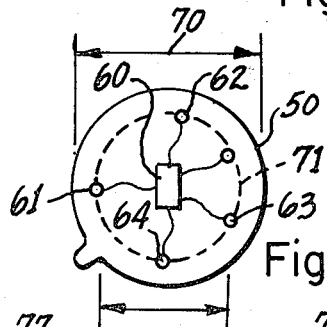
Fig.4.
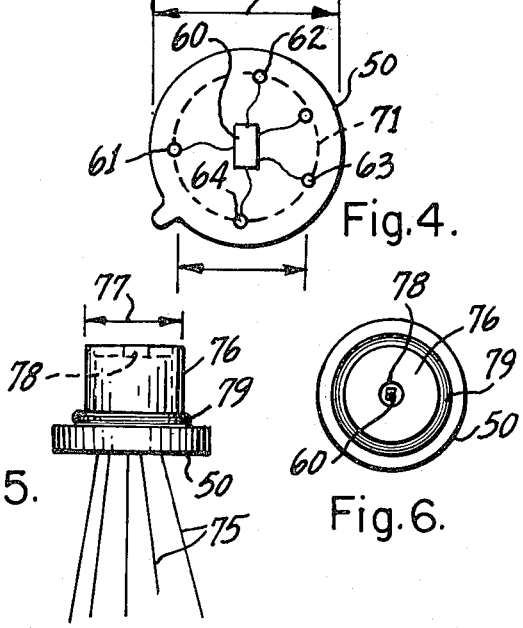
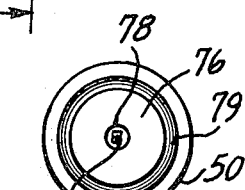
Fig.5.
Fig.6.

ECONOMICAL PRESSURE TRANSDUCER ASSEMBLIES, METHODS OF FABRICATING AND MOUNTING THE SAME

This is a divisional of application Ser. No. 423,713, filed on Dec. 11, 1973, now U.S. Pat. No. 3,900,811.

BACKGROUND OF THE INVENTION

This invention relates to force transducers in general, and more particularly to an improved, low cost transducer capable of accurate measurements while inexpensively produced and mounted.

Due to the requirements imposed by increasing technological gains, the prior art is aware of the need for a low cost accurate pressure transducer. As is well known, in general, accuracy and cost usually go hand in hand and increased accuracy or reliability is usually determinative of increased cost.

In any event, cost is indicative of many alternate factors such as testing and calibrating the transducer, mounting the transducer and so on.

Typical accurate prior art transducers were and are relatively expensive as compared, for example, to integrated circuit structures in general.

The reasons for such expense involve the above-noted considerations in regard to testing, fabrication, mounting and calibrating such units.

While the prior art was cognizant of these costs; such problems were further complicated by the fact that a low-cost transducer is needed for extensive use in the automotive industry, fuel metering, process control and barometry. As is known, the nature of such uses dictate costs far below the cost usually attributed to a transducer.

A proposed solution has been envisioned by at least one manufacturer and the technique and resultant structure is evidenced by a publication entitled INTEGRATION BRINGS A GENERATION OF LOW-COST TRANSDUCERS by Arthur R. Zias and William F. J. Hare of National Semiconductor Corporation and published in Electronics, Dec. 4, 1972, a McGraw-Hill publication on pages 83 to 88.

According to that approach, a low cost transducer comprises a Wheatstone bridge arrangement of four piezoresistors diffused into a silicon chip. The silicon chip is a pressure or force diaphragm that has been etched out of the wall of a vacuum reference cavity. The device is a hybrid circuit mounted on a single ceramic substrate which further contains an array of thick film signal processing resistors, mechanical enclosures and two operational amplifiers that serve as a buffer amplifier and an output amplifier respectively. Hence, the manufacturer contends that the unit, while being an accurate pressure transducer is primarily a typical integrated circuit.

This particular integrated circuit assembly employs thick film technology with the use of a high expansion ceramic substrate. While the pressure diaphragm or force collector is mounted on a silicon backing plate in an attempt to minimize temperature affects, the use of a high expansion ceramic substrate requires a clamping area of substantial thickness to provide effective isolation of the diaphragm from the substrate. This is accomplished in the prior art by etching approximately 10 mils of silicon to form a 2 mil thick diaphragm. The approach is extremely expensive and relatively difficult to control to the exact thickness.

To provide reliability, a minimum number of circuit elements should be exposed to the force transmitting environment and preferably these elements should at least include the piezoresistive element and the force collector or diaphragm. Prior art embodiments would include transistors and amplifiers in the environment including passive elements, which were protected by a relatively thick layer of silicon grease.

Actually for many applications, the user still must perform calibration control in regard to the unit. That is since the transducer is an integral part of the integrated circuit assembly, all parameters effecting accuracy of pressure measurement, including amplifier drift, circuit component tolerance, temperature response of both the transducer and transistor assemblies still have to be monitored. Thus, a user might have to further trim or adjust resistor values and circuit components in order to acheive accurate pressure measurements.

It is clear that as much as 50 percent of the cost of a pressure transducer may be attributable to its calibration and testing. Hence, a user still experiences problems in cost, in attempting to incorporate such a unit in an assembly.

Furthermore, extreme care is required in operating such an assembly in regard to power supply tolerances, temperature ranges and so on as the components peripheral to the pressure sensor affect the overall operation of the unit.

It is therefore, an object of this invention to provide a low cost, accurate pressure transducer, as a self-contained module reliably mounted in an economical package and which device can be used with external circuitry under the control and specifications of the user.

Further objects are to provide a transducer whereby the elements exposed to the force transmitting environment are protected and as so are relatively immune to corrosive substances present in the environment. The transducer further utilizes a glass bond to secure the same to a corrosion resistant housing and further allows the use of a small depression to assure a proper thickness diaphragm without excessive etching of silicon.

BRIEF DESCRIPTION OF PREFERRED EMBODIMENT

A pressure transducer assembly, comprises a first wafer of semiconductor material having a top surface for accommodating at least one piezoresistive element, and a bottom surface having an aperture surrounding the area of said top surface upon which said element is located, a layer of insulating material secured to said bottom surface to close said aperture, a layer of a semiconductor oxide covering said top surface of said wafer to thereby cover said element for protecting the same against deleterious substances present in said force transmitting environment and a second wafer of a semiconductor material secured to said layer of insulating material on the surface opposite to that surface secured to said first wafer to serve as an attenuator for said transducer.

BRIEF DESCRIPTION OF FIGURES

FIGS. 1A to 1G show a series of cross-sectional plan views depicting a method of fabricating a transducer assembly according to this invention.

FIG. 2 is a top plan view of a plurality of diffused bridge patterns according to a step in the fabrication process depicted in FIGS. 1A to 1G.

FIG. 3 is a partial top plan view of one of said plurality of transducer assembly according to a different step in the fabrication process.

FIG. 4 is a top plan view of a mounting base plate for a transducer according to this invention.

FIG. 5 is a front elevational view of a mounting arrangement or package assembly for a transducer.

FIG. 6 is a top plan view of the package and assembly depicted in FIG. 5.

DETAILED DESCRIPTION OF THE FIGURES

Before proceeding with the detailed specifications, a few terms to be utilized will be discussed in order to provide clarity to the foregoing description.

The specification will make reference to a piezoresistive element incorporated in a Wheatstone or other bridge configuration. The piezoresistive effect depends upon the change of resistivity due to the effect of force or strain on a semiconductor. The effect of stress is to introduce a highly ansiotropic change in carrier mobility.

Thus, depending upon the crystallographic plane, certain piezoresistor elements can be mounted to be responsive to tension components of force, as applied to a diaphragm while others are responsive to compression. Generally, silicon is utilized as diaphragm because of its Young's modules and the ability to enable diffusion or fabrication of piezoresistive devices integrally on a surface of the diaphragm, thus enabling temperature matching and so on. Generally, the devices are extremely accurate and have been extensively used where such accuracy is warranted as compared to the relatively high cost of fabrication.

Referring first to FIG. 2, there is shown a top view of a silicon wafer 10, incorporating on the surface a plurality of individual bridge configurations 11,12,13,14 and 15. While the top five bridge configurations have been referenced, an additional number are shown beneath. It is, of course, understood that many more such configurations can be accommodated on a silicon wafer 10, strictly dependent upon wafer size and bridge dimensions. In any event, a plurality of piezoresistive bridge patterns can be conventionally diffused on a wafer 10 of silicon using conventional semiconductor techniques. Each pattern is representative of a bridge configuration, by way of example, and contains four piezoresistive elements to form a typical Wheatstone bridge configuration.

While the process is described as diffusion, one can utilize an epitaxial growth process and so on to fabricate the plurality of bridge patterns 11 to 15. The pattern can be impressed on the wafer 10 by means of a photo-lithographic process or an oxide masking technique. Each of the piezoresistors included in bridge pattern as 11, are isolated from the silicon wafer or substrate 10 by means of a P-N junction, afforded by the diffusion process or are otherwise isolated. The patterns are aligned so that each bridge is located with respect to the crystallographic axis of the silicon wafer 10, so that two of the piezoresistors will be sensitive to a compression stress and two to a tension stress due to the application of a uniform load to the fixed edge diaphragm. The thickness of the active region of the wafer 10, which is to serve as the diaphragm, serves to determine the rated load and output of the final transducer and this thickness may vary between 0.001 and 0.040 inches.

In any event, a manufacturer can diffuse or form a large number of such patterns in the same time and with relatively the same effort as the fabrication of one such pattern.

FIG. 1A shows a cross sectional view taken through line 1A—1A of FIG. 2 and the patterns are generally represented in FIG. 1A by numerals 11 to 15 and for clarity, are shown as rectangular configurations. The wafer 10 is shown in cross section and as indicated, is single crystal silicon, preferably of the N type. The N standing for a doping level of silicon incorporating a plurality of negative donors or electrons, thus assuring that the flow of excess free electrons have a negative charge.

After the requisite number of patterns have been diffused in the wafer 10 or otherwise formed, a layer of silicon dioxide 16 (FIG. 1B) is formed by a reoxidation process. It is, of course, understood that the layer 16 is formed over the entire surface of the wafer 10 and covers all the patterns as diffused.

Referring to FIG. 3, there is shown a top view of a typical bridge pattern as 11 on the surface (partial view of the surface of wafer 10), after the next processing step as depicted in FIG. 1C.

As seen in FIG. 3 and 1C, a plurality of small holes 20–24 or channels are opened in the oxide layer 16 and located within a region about the gage or bridge 11 defined as a contact area. The holes or channels 23 and 24 are opened and formed by a masking and etching process, which etch affects the silicon dioxide layer 16 and is arrested when contacted by the silicon wafer 10 surface. This process or step is referred to as a selective etching process and is well known. Alternatively, one does not have to open apertures in the oxide layer 16 and the contacts can be formed directly or otherwise.

Referring to FIG. 3 and 1C after the apertures or channels 20 to 24 are so formed, the contact locations, as shown in FIG. 3 are metallized by evaporation or metalization process, whereby platinum is deposited within the contact areas as 20–24 to form the terminal and contact dots as shown in FIG. 3. The platinum process results in the formation of a Platinim-silicon compound. The areas so affected are then remetalized with a titaninum platinum alloy in the contact areas 20–24 to form a highly reliable, temperature independent contact and lead configuration as shown in FIG. 3.

Referring to FIG. 1D, the silicon wafer 10 is now selectively etched to a desired depth by using a mask on the underside of the wafer 10. The wafer is etched beneath each bridge pattern 11 to 15 to form an aperture directly beneath the resistor pattern. These apertures are designated respectively as 31,32,33,34 and 35 and one exists for each pattern formed as 11,12,13,14 and 15.

Referring to FIG. 3, it is noted that the pattern 11 is surrounded by a dashed line 30. This line represents the dimension of the apertures 31 to 35 with respect to the bridge 11 configuration.

The area enclosed within the dashed line 30 as encompassing the bridge 11, is the active area or the diaphragm area. This active area is the area which will deflect most readily upon the application of a force to the diaphragm. It is seen that the thickness of the wafer below the pattern as determined by the apertures 31 to 35 defines diaphragm thickness. The outside area of the wafer or that area not enclosed by the dashed line 30 represents the non-active area of that area which contains the contacts 20–24 and which does not deflect upon application of a force.

The diffusion bonding technique results in a near perfect thermal match between the integrated sensor and substrate, given the choice of proper substrate material. Thus, only a minimum thickness of the annular ring is required to form the depression serving to differentiate the active and nonactive areas. Since the diaphragm thickness determines final pressure response characteristics and since the output at a given pressure is inversely related the square of diaphragm thickness, clearly, maximum control of this parameter is requisite. This is particularly true in low cost applications where high yield is mandatory. Since a minimum amount of material removal is required, precise control of the chemically etching process or other mechanical processes used to define the diaphragm is easily obtained.

Alternately, depressions may be formed in the insulating layer with a flat silicon wafer used as a diaphragm. This approach has certain advantages in maintaining thickness control at reduced cost, since the initial wafer thickness determines the pressure range, etc.

For a clearer understanding of the functions and locations of the active and non-active areas, reference is made to U.S. Pat. No. 3,654,579 entitled ELECTROMECHANICAL TRANSDUCERS AND HOUSINGS issued on Apr. 4, 1972 to Anthony D. Kurtz, Joseph Mallon and Charles Gravel and assigned to Kulite Semiconductor Products, Inc., the assignee herein.

Referring to FIG. 1E, there is shown the structure with the respective projections bonded or secured to a sheet of glass 40. This can be accomplished by the use of a diffusion bond or otherwise. What occurs is that the structure shown in FIG. 1D is positioned on a glass sheet 40 as shown in 1E. Sufficient pressure is exerted between the structure of 1D and the glass to assure intimate contact between the structure and the glass. The assembly is clamped and placed in a heating enclosure. The temperature is raised to about 800°F and an electric field is applied between the wafer 10 and the glass sheet 40. The field enhances ion diffusion and a bond will form in time between the glass in contact with the wafer. The bond is shown as a darkened line there between. The glass sheet or layer 40 as bonded, closes or covers each depression as 31 to 35 and seals the hollow created by the depression.

FIG. 1F shows a further step of bonding the appropriate surface of the glass sheet 40 to an additional slice of silicon or another somewhat thicker wafer of silicon 45. The bond is implemented in the same fashion as indicated above and thus, a composite assembly is formed, comprising a layer of silicon dioxide 16 grown on a processed wafer of silicon 10, which as processed is secured to a glass sheet 40, which sheet 40 is thence secured or bonded to a thicker silicon wafer 45. It is noted that the original wafer 10, as containing a plurality of bridge patterns and as processed as above, now includes a plurality of independent transducer assemblies, all complete with piezoresistors, contacts, diaphragms and terminal locations.

The composite structure of FIG. 1E is now scribed along the dashed lines shown in FIG. 1F and along other lines (not shown) to separate the plurality of transducers into individual transducer assemblies as the one shown in FIG. 1G.

Thus, a great number of individual transducers are obtained via the above described common processing procedure.

In any event, a major problem occurs in mounting the device. Since a transducer can be used to monitor pressure or force in a highly contaminated environment, it is imperative that the silicon not be exposed, as many deleterious substances in the force transmitting environment will attack and react with the silicon. The prior art used pressure tight seals about the silicon or pressure tight bonding. These techniques could produce extraneous strains on the piezoresistors as well as temperature dependence due to the fact that the housings had different coefficients of expansion or temperature coefficients than did the silicon wafer.

Referring to FIG. 4, there is shown a top view of a typical transistor mounting base assembly. For example, a transistor may be mounted in a TO-5 package. A TO-5 package includes a base plate 50 which is approximately 0.370 inches in diameter. The leads included in an area shown dashed which is about 0.200 inches in diameter. The cover of the header is approximately 0.240 inches high and is welded to the base plate or press-fitted. The TO-5 package provides a good hermetic seal and protects the transistor contained therein from deleterious substances in the environment. Hence, the transducer 66 shown in FIG. 1G can be positioned as shown in FIG. 5. Assume the base 50 is a TO-5 of the dimensions discussed. Conventionally, the dimensions of the transducer 60 are smaller, the transducer 60 is positioned as shown and the platinum contacts formed are ball bonded to the posts 61–64 of the base plate. The unit is then capped with a cylindrical TO-5 header. It is, of course, understood that additional post and accommodating holes as those in excess of three (used in a transistor as base, emitter, and collector leads) can be easily added and TO-5 packages with leads or posts in excess of three, are readily available.

In any event, while the above described package will suffice for most applications, it still presents somewhat of a problem. Namely, the case of a standard TO-5 package including the base plate and cylindrical cover requires pressure fits or welding which can affect or damage the transducer. As indicated, a transducer is fabricated so that its diaphragm moves with applied force, this is not the case in a transistor. Hence, undue force on the diaphragm section of the transducer during packaging may, in fact, rupture or pre-stress the transducer or cause inaccuracies in the finished transducer. In particular, mounting stress is known to cause changes in zero shift and transducer sensitivity. If the mounting stress has a time dependent component, undersirable effects such as thermal hysteresis of zero, pressure hysteresis and nonrepeatable thermal sensitivity characteristics are also found.

Hence, a new mounting technique has been implemented which offers full advantage of accurate transducer operation with a minimum effect due to mounting or package configuration.

A transistor type header 50 of FIG. 4 is fabricated from a solid piece of kovar and has a diameter 70 according to the dimensions of a TO-8 package base plate, which specifies a diameter 60 of between 0.550 to 0.650 inches. The Kovar is about 80 mils thick or about twice the thickness of the typical transistor package base plate. The pin location to specify the posts is located about the dashed lined circle 71 according to the pin dimensions of a TO-5 package and hence, the diameter of circle 71 is about 0.200. The requisite number of terminal or posts area are thus located, pins are inserted in the Kovar base as conventionally implemented, the transducer 60 is positioned as shown and the platinum contacts are connected electrically using conventional micro circuit bonding techniques. Thus, the area lying outside the dashed circle 71 is greater than that in a conventional TO-5 configuration.

The Kovar base plate being thicker and more rigid than a conventional transistor header base plate serves as a more secure mounting surface for the transducer 60.

Shown in FIG. 5 is the final package assembly for transder 60. The base plate 50 of Kovar, as indicated, has a post or pin spread according to the dimensions of a TO-5 arrangement; while the outside diameter is according to a TO-8 assembly. A Cylindrical cover or cap assembly 76 is placed over the Kovar base plate 50. The cap 76 is a standard TO-5 cap and therefore the dimension or diameter 77 is between 0.305 and 0.335 inches. The TO-5 cap assembly 76 has an aperture 78 in the center thereof, for communication with the pressure transducer 60. Such a cap 76 with an aperture is readily available as this is a normal structure used for phototransistor assemblies, where a transistor or semiconductor device is to be responsive to a light beam. It is also understood that a screen could be placed over the aperture to protect the assembly from large particles in the force transmitting environment. Since the TO-5 cap 76 is placed on the TO-5 dimensioned Kovar base 50, an extended flange is formed. This allows one to secure the cap to the base by means of a pressure seal 79 to prevent the use of large forces as the additional flange area allows and provides more working and operating space. While a pressure port 78 is shown in the top of the header, it is also determined that an optional aperture or pressure port can be placed in the base of the transducer plate to allow one to measure differential pressure and therefore use the gage as a differential pressure transducer. In such applications, the transducer would provide an output proportional to the difference of pressure at the top and base pressure ports.

The structure has the further utility in that the TO-5 assembly and the TO-8 base are both easily accommodated by conventional automatic transistor processing equipment. Such equipment, as packaging and fabricating machines are dimensioned to accommodate the TO-5 pin placement and posts as well as the TO-8 base plates and TO-5 headers or caps. The final packaging can be used "as is" as a transducer or alternately it can be secured via the flange to a variety of packages. In the transducer industry it is often necessary to tailor the package to the end use. The method outlined provides a module which is readily adaptable to packaging in a variety of forms.

The final assembly, including the above described transducer is inexpensive, while providing all the advantages of the silicon gage configuration.

Referring again to FIG. 1G, the unique and advantageous qualities of the transducer 60 will now be enumerated.

1. The entire surface of the transducer which faces the force transmitting environment (arrow direction), is coated with a layer of silicon dioxide 16. As is known, this layer is extremely stable and relatively immune to corrosive elements in the force transmitting environment.

2. The platinum contacts 80 are also extremely resistent to corrosion and hence, all parts of the assembly exposed to the environment are immune to corrosion.

3. The solid silicon wafer 10 is simultaneously processed to provide a large number of patterns and etched to provide exact diaphragm width via the aperture 31.

A layer of glass 40 is inorganically bonded to the silicon wafer 10 and serves as a perfect insulator to prevent contact and provide isolation of the structure from any mounting surface such as, for example, the Kovar plate of FIG. 4.

4. The thick silicon wafer 45 serves as an attenuator and adds mass to the assembly to discriminate against insignificant pressure perturbations and to further provide great rigidity to the entire transducer assembly enabling easier handling and greater immunity to shock and vibrations.

5. A packaging arrangement is disclosed which takes proper cognizance of transducer art and in particular, allows stress free mounting of the integrated sensor assembly. As noted in specification, this allows better production control, reduced cost, and superior transducer performance, 6. The transducer package employed is compatible with production techniques of adding additional circuit elements where required or necessary. For instance, typically one can add a thick film module composed of hybird resistors at the back of the flange 50. Resistors can be attached to the substrate which mates with the Kovar pins. It is thus compatible with various micro-circuit production techniques for active components such as amplifiers, etc.

We claim:

1. A method of fabricating a pressure transducer comprising the steps of:
    a. diffusing a plurality of piezoresistive bridge patterns on a given surface of a first wafer of semiconductor material,
    b. coating said diffused surface with a layer of semiconductor oxide material,
    c. forming apertures in said layer to contact each of said patterns,
    d. metalizing said apertures to form a series of metal contact areas on said surface of said layer,
    e. forming a series of apertures on the opposite side of said wafer and beneath each of said patterns to define an active diaphragm area,
    f. bonding said wafer at said opposite side to a layer of an insulator material to close each of said apertures formed on the opposite side of said wafer,
    g. bonding said opposite side of said glass layer to a thicker wafer of semiconductor material to act as an attenuator for said transducer, and
    h. separating each of said patterns together with all bonded members to provide a given number of separate pressure transducers structures equal to said plurality.

2. The method according to claim 1 wherein:
    a. said first wafer of semiconductor material is n-type single, crystal silicon.

3. The method according to claim 2 wherein:
    a. said layer of semiconductor oxide material is silicon dioxide.

4. The method according to claim 1 wherein said metal contact areas are formed from platinum.

5. The method according to claim 1 wherein said layer of insulator material is glass.

6. The method according to claim 1 wherein said thicker wafer of semiconductor material is silicon.

* * * * *

UNITED STATES PATENT OFFICE
CERTIFICATE OF CORRECTION

Patent No. 3,924,322  Dated  December 9, 1975

Inventor(s) Anthony D. Kurtz, et al

It is certified that error appears in the above-identified patent and that said Letters Patent are hereby corrected as shown below:

Claim 1 - Column 8, line 54 - delete "glass" and insert

---insulator---.

Signed and Sealed this twentieth Day of April 1976

[SEAL]

Attest:

RUTH C. MASON  
*Attesting Officer*

C. MARSHALL DANN  
*Commissioner of Patents and Trademarks*